(12) United States Patent
Menkhoff

(10) Patent No.: US 7,184,504 B2
(45) Date of Patent: Feb. 27, 2007

(54) RECEIVER HAVING AN INTEGRATED CLOCK PHASE DETECTOR

(75) Inventor: Andreas Menkhoff, Oberhaching (DE)

(73) Assignee: Infineon Technologies AG, Munich (DE)

( * ) Notice: Subject to any disclaimer, the term of this patent is extended or adjusted under 35 U.S.C. 154(b) by 795 days.

(21) Appl. No.: 10/192,602

(22) Filed: Jul. 10, 2002

(65) Prior Publication Data

US 2003/0021370 A1    Jan. 30, 2003

(30) Foreign Application Priority Data

Jul. 12, 2001   (DE) ................. 101 33 698

(51) Int. Cl.
*H04L 7/00* (2006.01)
(52) U.S. Cl. ..................... 375/355; 375/316
(58) Field of Classification Search ............. 375/355, 375/354, 316, 340, 343, 330, 329
See application file for complete search history.

(56) References Cited

U.S. PATENT DOCUMENTS

| | | | |
|---|---|---|---|
| 3,771,051 A * | 11/1973 | Abbe ........................ 324/662 |
| 3,993,956 A * | 11/1976 | Gilmore et al. ............. 375/330 |
| 5,601,083 A * | 2/1997 | Anderson ................... 600/443 |
| 5,793,796 A * | 8/1998 | Hulbert et al. ............. 375/150 |
| 6,219,374 B1 * | 4/2001 | Kim et al. .................. 375/130 |

* cited by examiner

*Primary Examiner*—Kevin Burd
(74) *Attorney, Agent, or Firm*—Jenkins, Wilson, Taylor & Hunt, P.A.

(57) ABSTRACT

Receiver is provided having an integrated clock phase detector for the detection of the clock phase deviation between desired sampling instants and the sampling instants of a reception signal which is transmitted from a transmitter (2) with a transmission filter via a transmission channel (3) to the receiver (1). The receiver has at least one matched filter (8) and at least one frequency matched filter (9). The magnitude of a first convolution product of the impulse response of the transmission filter, of the transmission channel (3) and of the matched filter (8), for the maximization of the signal/noise power ratio (SNR) of the reception signal, is maximal at the desired sampling instants. The transfer function FMF (f) of the frequency matched filter (9) is the first derivative in the frequency domain of the transfer function ME (f) of the matched filter (8), in which case at least one multiplier (11) is provided, which multiplies an output signal of the matched filter (8) by an output signal of the frequency matched filter (9) to form a clock phase deviation detection signal (TP).

14 Claims, 13 Drawing Sheets

1st embodiment

RECEIVER HAVING AN INTEGRATED CLOCK PHASE DETECTOR

TECHNICAL FIELD

The invention relates to a receiver having an integrated clock phase detector for estimating the clock phase deviation between desired sampling instants and sampling instants of a reception signal which is transmitted from a transmitter with a transmission filter via a transmission channel to the receiver.

BACKGROUND ART

According to Shannon's transmission model, data originating from a data source are transmitted by a transmitter via a transmission channel to a receiver and output from the latter to a data sink. During the transmission via a real transmission channel, the reception signal generally has linear distortions and an additional noise component. The noise component can be modelled by additive white Gaussian noise (AWGN). The task of the receiver is to reconstruct the bit sequence of the data source from the reception signal. In this case, a reception filter suppresses possible interference signals outside the transmission frequency band. Through suitable dimensioning of a matched filter, in particular, the reliability of the detection is thereby greatly increased. The timing of the transmission pulses is recovered by a synchronization device. In this case, the reception signal is sampled and fed to a threshold value decision unit, which outputs a detected bit sequence for further data processing. If additive noise severely interferes with the data transmission, a so-called matched filter (MF) is used within the receiver. This reception filter is specifically matched to the basic transmission pulse, so that a maximum signal-to-noise ratio (SNR) is achieved at the detection instants. The impulse response of the matched filter (MF) is usually set to be equal to the temporally mirrored basic transmission pulse or basic transmission pulse shifted by a bit duration. The matched filter is a digital reception filter within the receiver which is matched to a transmission filter within the transmitter in such a way that the amplitude of the received signal is maximal at the sampling instants. The matched filter can be of adaptive construction, so that it can be matched to the transmission channel, or an adaptive equalizer which compensates for the distortion of the transmission channel may be provided downstream or upstream of the matched filter. Frequency matched filter (FMF) is a term denoting a digital filter whose transfer function in the frequency domain is equal to the first derivative of the transfer function of an associated matched filter. For timing recovery, the receiver contains a synchronization device with a clock phase detector for the detection of the clock phase deviation between desired sampling instants and the sampling instants of a reception signal.

FIG. 1 shows a receiver according to the prior art. The receiver contains an analog/digital converter ADC for converting the analog reception signal into a digital reception signal, which is fed to a mixer. Connected downstream of the mixer is a digital resampling filter which outputs a digital output signal whose symbol rate is a factor r higher than the symbol rate of the digital reception signal. The digital output signal of the resampling filter is fed to the matched filter of the receiver, which outputs the filtered output signal with a decimated data symbol rate for further data processing. The output signal of the resampling filter is furthermore fed to a frequency matched filter which is associated with the matched filter and outputs a filtered output signal to a carrier frequency detector TFD. The filtered output signal of the matched filter MF is forwarded to a clock phase detector TPD, which is provided for clock phase detection of the digital reception signal. The clock phase detector TPD and the carrier frequency detector TFD are connected, on the output side, in each case to a digital loop filter and to an NCO which supplies a control signal. The clock phase detector TPD outputs a clock phase deviation signal TP to the associated digital loop filter and the NCO connected downstream supplies a digital control value for the driving of the resampling filter. The resampling filter carries out keying of the reception signal, band limiting simultaneously being effected. In this case, the control signal output by the NCO sets the sampling instant in a manner dependent on the filtered clock phase deviation signal.

The clock phase detector TPD according to the prior art is referred to as a Gardner clock phase detector after its developer F. M. Gardner. In the case of the receiver according to the prior art as illustrated in FIG. 1, the digital clock and carrier frequency recovery is effected without recourse being made to decisions in the process. This is also referred to as NDA (non decision aided) timing parameter estimation. In this case, sampling signal values are used for clock and carrier signal recovery which are taken downstream of a matched filter or an equalizer for clock and carrier recovery. Such receivers are described for example in Heinrich Meyr "Digital Communication Receivers" Wiley, N.Y., 1998.

The disadvantage of a receiver which contains a clock phase detector TPD according to the prior art consists in the fact that the conventional Gardner NDA clock phase detector has a considerable inherent noise. The output signal of the clock phase detector TPD has a high variance.

FIG. 2 shows a clock phase detector with Gardner architecture according to the prior art, as is contained in the receiver illustrated in FIG. 1. The clock phase detector TPD receives, from the matched filter MF, a filtered digital input signal which is fed to a delay circuit and a differentiator. The differentiator carries out differentiation of the received digital input signal with respect to time, and multiplies the differentiated signal by the time-delayed output signal of the matched filter MF.

FIG. 3 shows the signal amplitude of the output signal of the matched filter with respect to the clock phase deviation. At the clock phase deviation zero, the first derivative of the output signal of the matched filter or the input signal of the clock phase detector is indeterminate and may be either greater than or less than zero. In other words, at a clock phase deviation which fluctuates around the ideal value, the conventional clock phase detector outputs an output signal with a high variance. The output signal of the conventional clock phase detector thus has a considerable inherent noise. In order to suppress this inherent noise, it is necessary to provide a digital loop filter connected downstream, which is complex in terms of circuitry. As a result of such a loop filter of complex construction, however, the receiver becomes temporally sluggish and cannot follow variations in the digital input signal. Conversely, if a digital loop filter having relatively low complexity in terms of circuitry is used, the inherent noise of the clock phase detector according to the prior art leads to a relatively inaccurate control signal for the resampling filter, so that the bit error rate rises.

SUMMARY OF THE INVENTION

Therefore, the object of the present invention is to provide a receiver with integrated clock phase detector in which the clock phase deviation detection signal has a minimal inherent noise.

This object is achieved according to the invention by means of a receiver having the features specified in Patent claim 1 and by means of a receiver having the features specified in Patent claim 14.

The invention provides a receiver having an integrated clock phase detector for the detection of the clock phase deviation between desired sampling instants and sampling instants of a reception signal which is transmitted from a transmitter with a transmission filter via a transmission channel to the receiver, having at least one matched filter MF and having at least one frequency matched filter FMF, the magnitude of a first convolution product of the impulse response of the transmission filter, of the transmission channel and of the matched filter, for the maximization of the signal/noise power ratio SNR of the reception signal, being maximal at the desired sampling instants, the transfer function of the frequency matched filter FMF being the first derivative in the frequency domain of the transfer function of the matched filter MF, in which case at least one multiplier is provided, which multiplies an output signal of the matched filter MF by an output signal of the frequency matched filter FMF to form a clock phase deviation detection signal TD.

In a preferred embodiment of the receiver according to the invention, the magnitude of a second convolution product of the impulse response of the transmission filter, of the transmission channel and of the frequency matched filter FMF is minimal at the desired sampling instants.

The output data symbol rate of the matched filter MF is preferably identical to or twice as high as the data symbol rate of the reception signal.

The clock phase deviation detection signal is preferably output from the multiplier to a digital loop filter.

An NCO is preferably connected downstream of the digital loop filter.

The NCO preferably drives a digital resampling filter.

The receiver is preferably a PAM or QAM receiver.

The matched filter MF is preferably a root cosine roll-off filter.

The receiver according to the invention preferably includes an analog/digital converter, which converts the analog reception signal received via the transmission channel into a digital reception signal having a specific data symbol rate.

The resampling filter preferably receives the digital reception signal and outputs a digital output signal to the matched filter MF connected downstream, the data symbol rate of the output signal output by the resampling filter being a predetermined factor higher than the data symbol rate of the digital reception signal.

In a particularly preferred embodiment of the receiver according to the invention, the receiver is a QAM receiver, the QAM receiver having: a first matched filter MF for the in-phase signal component of the reception signal, an associated first frequency matched filter FMF, a second matched filter ME for the quadrature phase signal component of the digital reception signal, an associated frequency matched filter FMF, a first multiplier, which multiplies the output signal of the first matched filter by the output signal of the associated frequency matched filter to form a first clock phase product signal, a second multiplier, which multiplies the output signal of the second matched filter of the associated frequency matched filter to form a second clock phase product signal, and having an adder, which adds the two clock phase product signals output by the multipliers to form a clock phase deviation detection signal.

The receiver preferably contains a channel equalization circuit which is connected downstream of the analog/digital converter or the matched filter.

In a particularly preferred embodiment, the receiver additionally has a carrier phase detector.

The invention furthermore provides a receiver having an integrated clock phase detector for the detection of the clock phase deviation between desired sampling instants and sampling instants of a reception signal which is transmitted from a transmitter with a transmission filter via a transmission channel to a receiver, having a matched filter and the magnitude of a first convolution product of the impulse response of the transmission filter, of the transmission channel and of the matched filter MF, for the maximization of the signal/noise power ratio of the reception signal, being maximal at the desired sampling instants, in which case there are connected downstream of the matched filter MF a clock phase filter TPF and, connected in parallel therewith, a delay circuit, whose output signals are multiplied by a multiplier to form a clock phase deviation detection signal TP.

In this case, the clock phase filter TPF preferably comprises two series-connected frequency matched filters FMF and a Hilbert filter HF.

The delay circuit and the clock phase filter TPF preferably have the same group delay time.

The delay circuit and the clock phase filter TPF preferably have the same decimation ratio.

The data symbol rate of the output signal of the matched filter MF is a predetermined factor r higher than the data symbol rate of the digital reception signal.

The clock phase deviation detection signal TP is output from the multiplier preferably to a digital loop filter.

In this case, an NCO is preferably connected downstream of the loop filter.

The NCO preferably controls a digital resampling filter.

The matched filter MF is preferably a root cosine roll-off filter.

Preferred embodiments of the invention's receiver with integrated clock face detector are described below with reference to the accompanying figures in order to elucidate features that are essential to the invention.

DETAILED DESCRIPTION OF THE INVENTION

Figure 4:
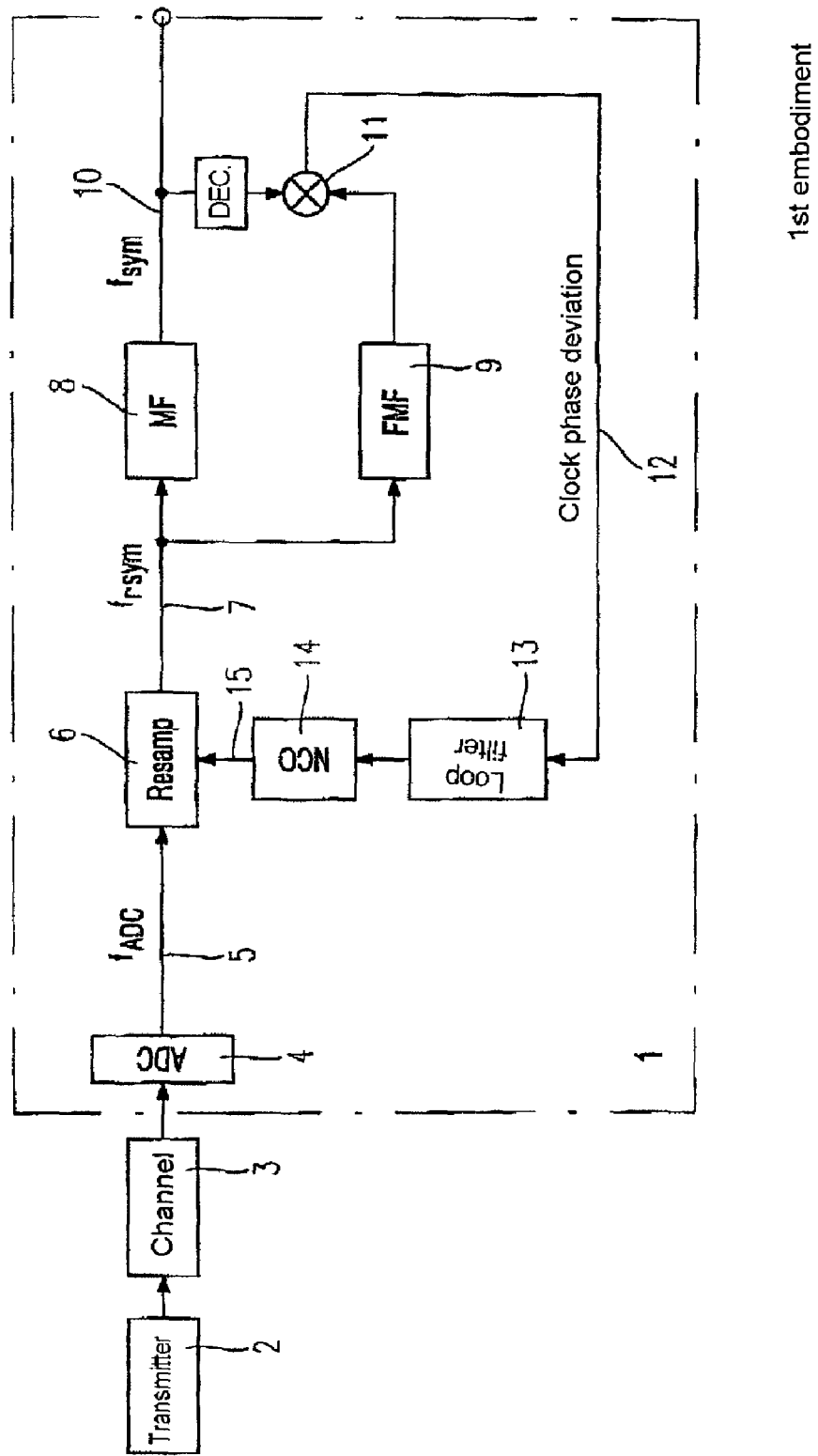
FIG. 4 shows a first embodiment of the invention's receiver with integrated clock phase detector.

FIG. 4 shows a first embodiment of the invention's receiver with an integrated clock phase detector for the detection of the clock phase deviation. In the case of the first embodiment illustrated in FIG. 4, the receiver 1 is a PAM receiver which receives an analog reception signal from a transmitter 2 via a transmission channel 3, which signal is converted into a digital reception signal by an integrated analog/digital converter 4. The digital reception signal is output with a data symbol rate $f_{ADC}$ via an internal line 5 to a resampling filter 6. The resampling filter 6 carries out keying and outputs a digital output signal via a line 7 to a matched filter 8 connected downstream. The digital output signal of the resampling filter 6 is a predetermined factor r higher than the data symbol rate of the digital input signal output by the analog/digital converter 4. The matched filter 8 is matched to the transmission channel 3 and the transmitter 2 and, if appropriate, to an equalizer circuit. In this case, the magnitude of the convolution product of the impulse response of the transmitter filter contained in the transmitter 2, of the transmission channel 3 and, if appropriate, of the equalizer and also of the matched filter 8, for the maximization of the signal/noise power ratio SNR of the reception signal, is maximal at the desired sampling instants. The receiver 1 furthermore contains a frequency matched filter 9 connected in parallel with the matched filter 8. The transfer function of the frequency matched filter 9 is matched to the transfer function of the matched filter 8, the transfer function FMF(f) of the frequency matched filter 9 in the frequency domain being equal to the first derivative of the transfer function MF(f) of the matched filter 8. The matched filter 8 outputs a filtered digital input signal via a line 10 for further data processing within the receiver 1, the data symbol rate of the matched filter 8 being equal to the data symbol rate of the digital input signal output by the analog/digital converter 4. The frequency matched filter 9 is of decimating construction in all of the embodiments, since the downstream multiplication is effected in the data symbol pattern.

The receiver 1 furthermore contains a multiplier 11, which multiplies the digital output signal of the matched filter 8, which, if appropriate, is frequency-decimated by a decimation filter to data symbol rate, by the digital output signal of the frequency matched filter 9 to form a clock phase deviation detection signal TP. The clock phase deviation detection signal TP is output via a line 12 from the multiplier 11 to a digital loop filter 13 connected downstream. Connected downstream of the digital loop filter 13 is an NCO 14 (NCO: Numerical Controlled Oscillator), which outputs a digital control signal to the resampling filter 6 via a control line 15. The resampling filter 6 is set in a manner dependent on the filtered clock phase deviation detection signal TP. In the receiver 1 according to the invention, the clock phase detection is effected on the basis of the digital output signals of the matched filter 8 and of the frequency matched filter 9. The data symbol rate of the output signal of the two filters 8, 9 is higher than the data symbol rate of the digital input signal, since the detection according to the invention is an NDA (non decision aided) detection. The two filters 8, 9 are decimating, i.e. the data symbol rate of their output signal is lower than the data symbol rate of the received digital signal. The two filters 8, 9 preferably have the same group delay time.

Figure 1:
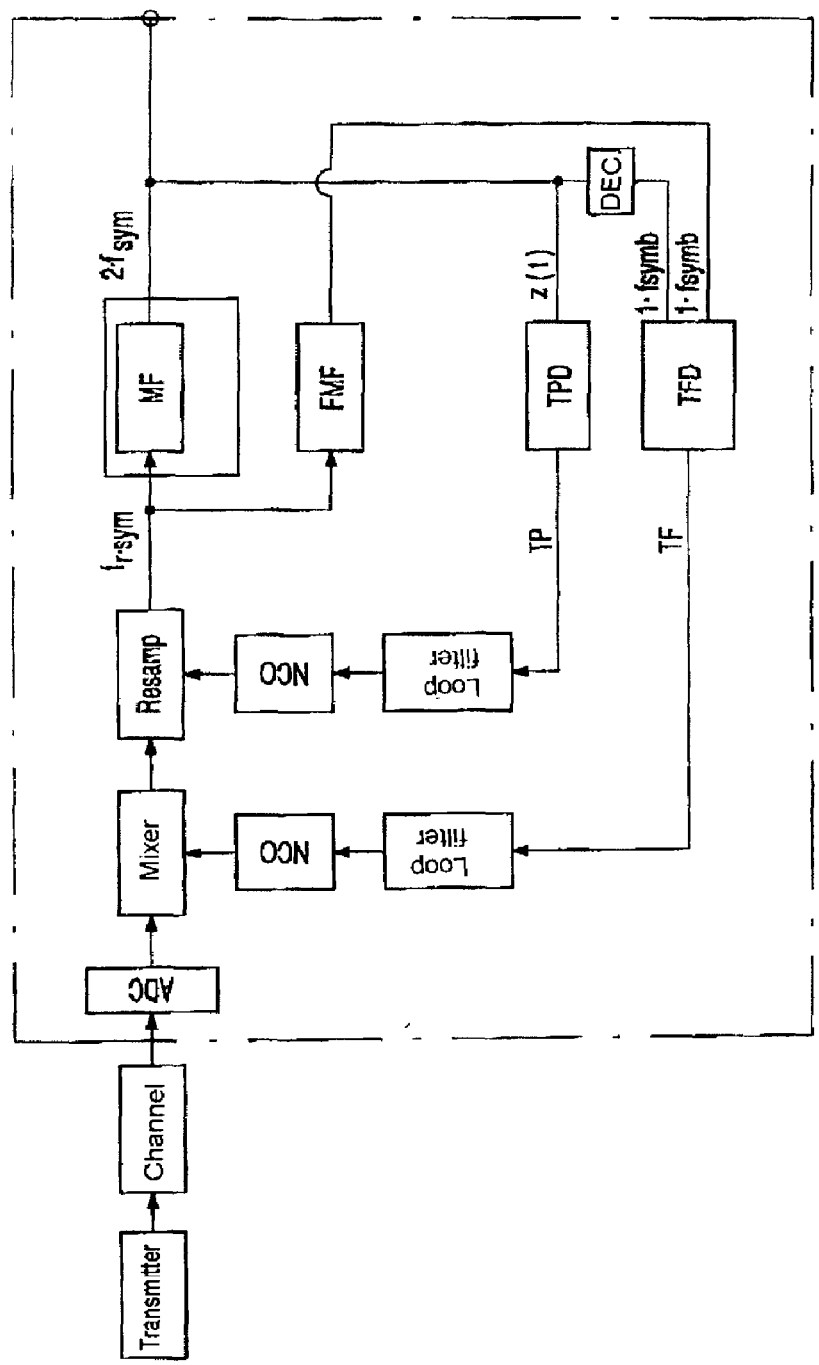
FIG. 1 shows a receiver according to the prior art.
Figure 2:
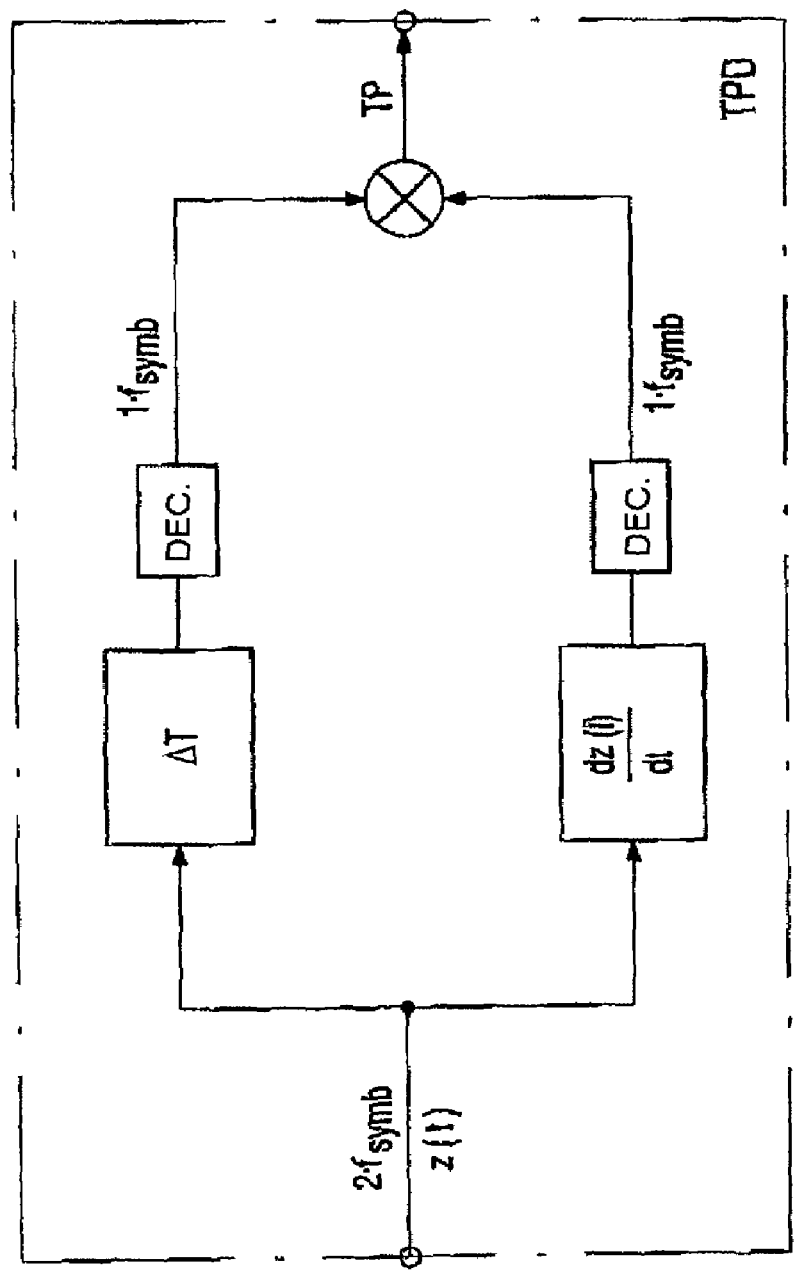
FIG. 2 shows a clock phase detector according to the prior art.
Figure 3:
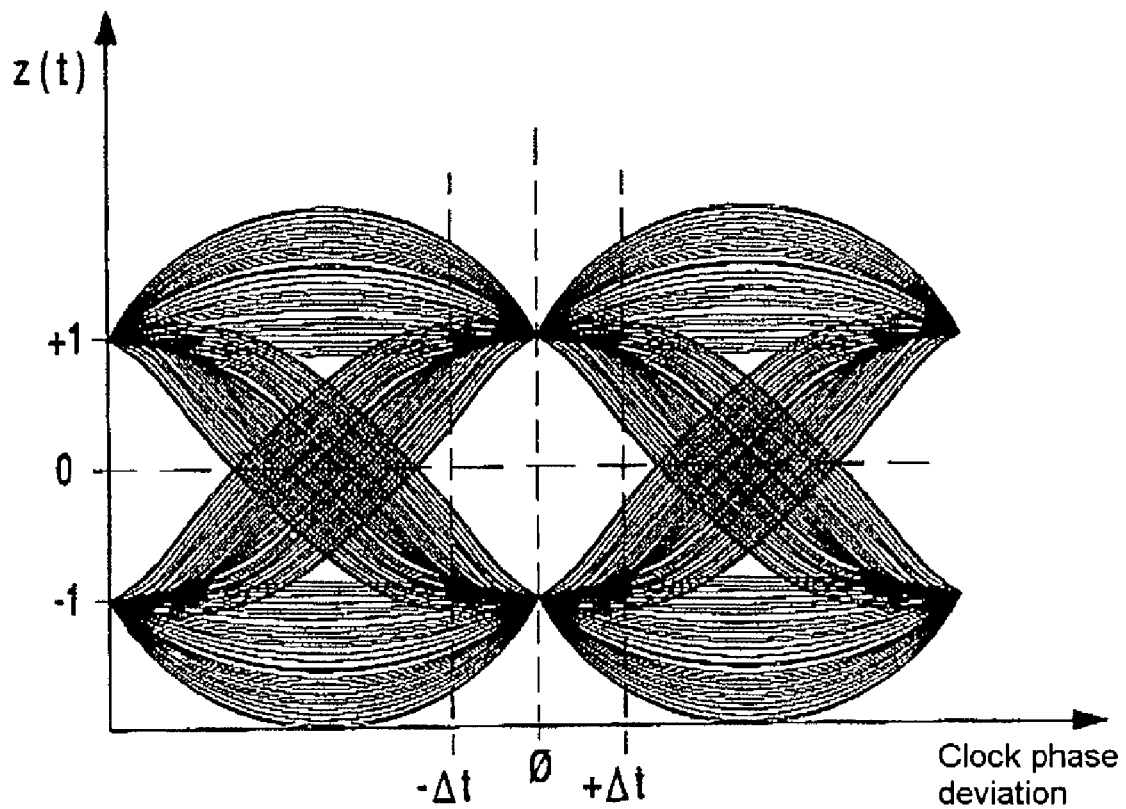
FIG. 3 shows an eye diagram for elucidating the problem area on which the invention is based.

If the Receiver according to the invention as illustrated in FIG. 4 is compared with the receiver according to the prior art as illustrated in FIG. 1, it can be seen that the frequency matched filter 9 provided for the carrier frequency detection is now additionally used for the clock phase detection. The circuitry outlay of the receiver 1 according to the invention is thus comparatively low compared with the receiver accordingly to the prior art, since only an additional multiplier 11 is required and the conventional clock phase detector—illustrated in FIG. 2—with a delay circuit and a differentiator circuit is no longer required. If the clock phase and the carrier frequency are exactly adjusted in the receiver 1 according to the invention, then the digital clock phase deviation detection signal TP ideally comprises a sequence of zeros, i.e. the clock phase deviation detection signal has no inherent noise whatsoever.

The transfer function of the matched filter 8 and thus of the frequency matched filter 9, to, are matched to the transmission filter of the transmitter 2, of the channel 3 and, if appropriate, of an equalizer. In this case, the magnitude of the convolution product of the impulse response of the transmission filter within the transmitter 2, the transmission channel 3, the channel equalizer and the matched filter 8, for the maximization of the signal/noise power ratio SNR of the digital reception signal, is maximal at the desired sampling instants. The filter coefficients of the matched filter 8 are set in such a way that they satisfy this condition. The magnitude of a further convolution product of the impulse response of the transmitter filter, of the transmission channel, of the equalizer and of the frequency matched filter 9 is minimal at the desired sampling instants. The output data symbol rate of the matched filter 8 and the data symbol rate of the digital reception signal output by the analog/digital converter 4 are identical.

The matched filter 8 is preferably constructed as a root cosine roll-off filter. The filter coefficients of the matched filter 8 and of the frequency matched filter 9 are set in such a way that the output signal of the multiplier 11 produces the digital value zero in the data symbol pattern. What is thereby achieved is that no inherent noise or pattern noise occurs. The group delay times of the two filters 8, 9 are preferably identical, so that the mutually matching samples are multiplied together by the multiplier 11. The transfer function of the frequency matched filter 9 in the frequency domain is equal to the first derivative of the transfer function of the matched filter 8. Since the filter coefficients of the frequency matched filter 9 depend on the filter coefficients of the matched filter 8, the matched filter 8 can also be constructed as an adaptive filter.

Figure 5:
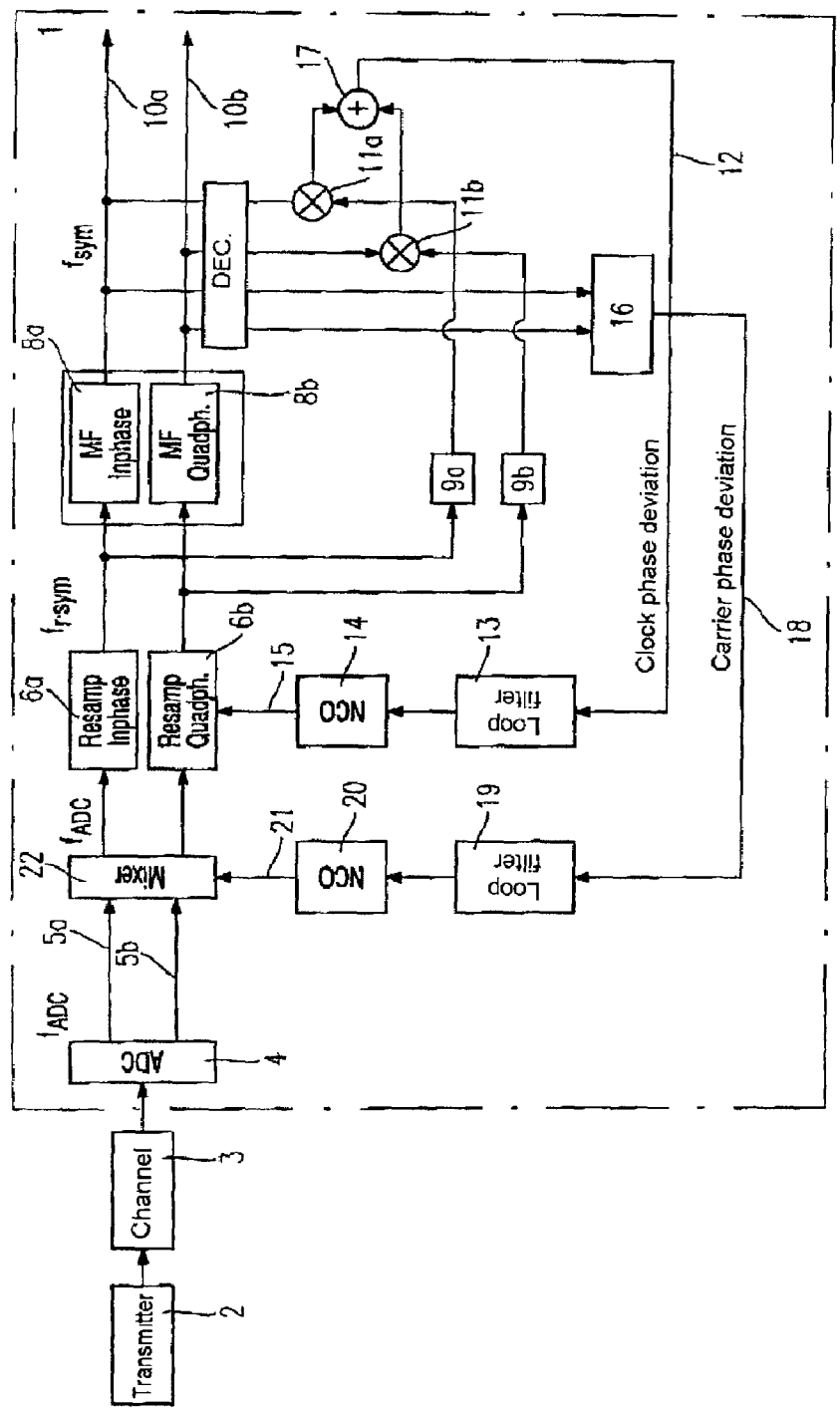
FIG. 5 shows a second embodiment of the invention's receiver with integrated clock phase detector.

FIG. 5 shows a second embodiment of the invention's receiver with integrated clock phase detector for the detection of the clock phase deviation. In the embodiment illustrated in FIG. 5, the receiver 1 is a QAM receiver 1 with a conventional carrier phase detector 16 and a clock phase detector according to the invention. The receiver 1 has a resampling filter 6a for the in-phase signal component and a resampling filter 6b for the quadrature phase signal component of the QAM signal. The two resampling filters 6a, 6b are set by a control signal which depends on the clock phase detection signal TP. The QAM receiver 1, as is illustrated in FIG. 5, contains a matched filter 8a for the in-phase signal component and a matched filter 8b for the quadrature phase signal component of the received digital QAM signal. The two matched filters 8a, 8b are respectively connected in parallel with an associated frequency matched filter 9a, 9b, the transfer function of the frequency matched filters 9a, 9b in each case corresponding to the first derivative of the transfer function of the associated matched filter 8a, 8b in the frequency domain. The output signal of the matched filter 8a is multiplied by the output signal of the frequency matched filter 9a by the multiplier 11a and output to an adder 17. The output signal of the matched filter 8b is likewise multiplied by the output signal of the associated frequency matched filter 9b by a multiplier 11b. The output signals of the two multipliers 11a, 11b are fed to the multiplier 17, which carries out an averaging of the two clock phase product signals output by the multipliers 11a, 11b for the purpose of generating a digital clock phase deviation signal TP. As already described in connection with the first embodiment illustrated in FIG. 4, the digital clock phase deviation signal TP is output to a digital loop filter 13 via a line 12.

The carrier phase detector 16 is constructed conventionally and generates a carrier phase detection signal TF, which is output via a line 18 to a further digital loop filter 19. Connected downstream of the digital loop filter 19 on the output side is an NCO circuit 20, which outputs a control signal via a control line 21 to a mixer 22. The mixer 22 mixes the reception signal into the basic frequency band. The two resampling filters 6a, 6b are connected downstream of the mixer 22.

Figure 6:
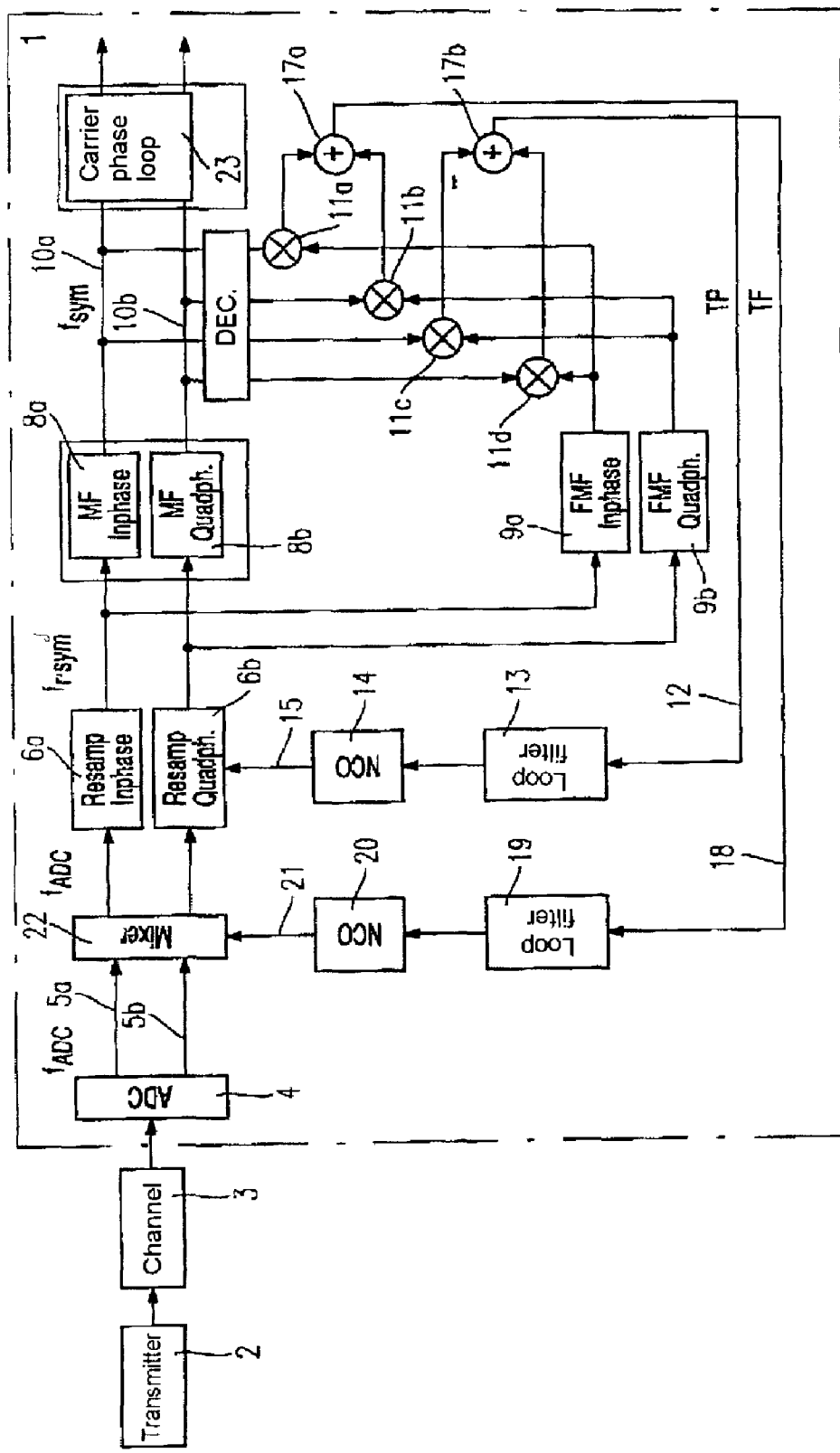
FIG. 6 shows a third embodiment of the invention's receiver with integrated clock phase detector and with a carrier frequency loop.

FIG. 6 shows a third embodiment of the invention's receiver 1 with integrated clock phase detector.

In the embodiment illustrated in FIG. 6, the carrier frequency detection signal TF is formed from the filtered output signals of the matched filters 8 and the frequency matched filters 9 by two multipliers 11c, 11d and a further adder 17b. In this case, the multiplier 11d multiplies the in-phase signal component filtered by the matched filter 8a by the quadrature signal component filtered by the frequency matched filter 9b. In the same way, the multiplier 11d multiplies the quadrature phase signal component filtered by the matched filter 8b by the in-phase signal component filtered by the frequency matched filter 9a. The output signals of the two multipliers 11c, 11d are averaged by the adder 17b and output as carrier frequency detection signal TF via the line 18 to the digital loop filter 19.

Furthermore, the receiver 1 contains a clock phase loop 23, which is connected downstream of the two matched filters 8a, 8b. The clock phase detection signal TP is generated in the same way as in the second embodiment illustrated in FIG. 5. In the preferred embodiment of a QAM receiver as illustrated in FIG. 6, both the clock phase deviation detection signal TP and the carrier frequency deviation detection signal TF are generated from the output signals of the matched filters 8a, 8b and the frequency matched filters 9a, 9b. The receiver 1 illustrated in FIG. 6 therefore requires only a minimal number of filters in order to generate both the carrier frequency deviation detection signal TF and the clock phase deviation detection signal TP. The circuitry outlay for the multipliers 11a–11d and the two adders 17a, 17b is comparatively low.

Figure 7:
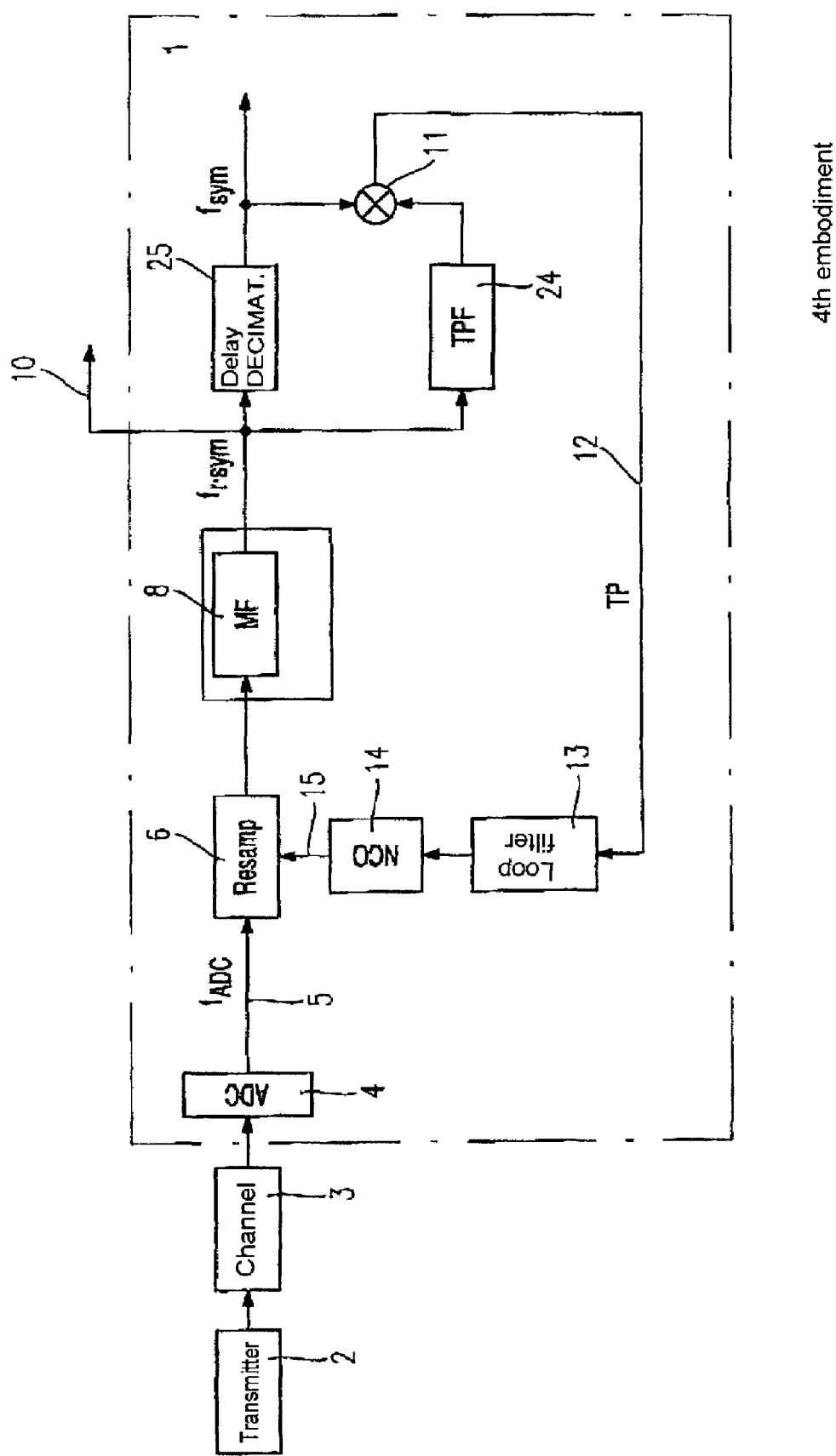
FIG. 7 shows a fourth embodiment of the invention's receiver with integrated clock phase detector.

FIG. 7 shows a fourth embodiment of the receiver 1 according to the invention. Like the embodiment illustrated in FIG. 4, the embodiment of the receiver 1 as illustrated in FIG. 7 is a PAM receiver. In the PAM receiver 1 illustrated in FIG. 7, a clock phase filter 24 and a delay circuit 25 are connected downstream of the matched filter 8. The clock phase filter 24 and the delay circuit 25 are connected in parallel with one another, the output signals of the clock phase filter 24 and of the delay circuit 25 being multiplied by a multiplier 11 to form a clock phase deviation detection signal TP, which is output via a line 12 to a digital loop filter 13. The clock phase filter 24 is decimating in all of the embodiments, since the downstream multiplication is effected in the data symbol pattern.

Figure 8:
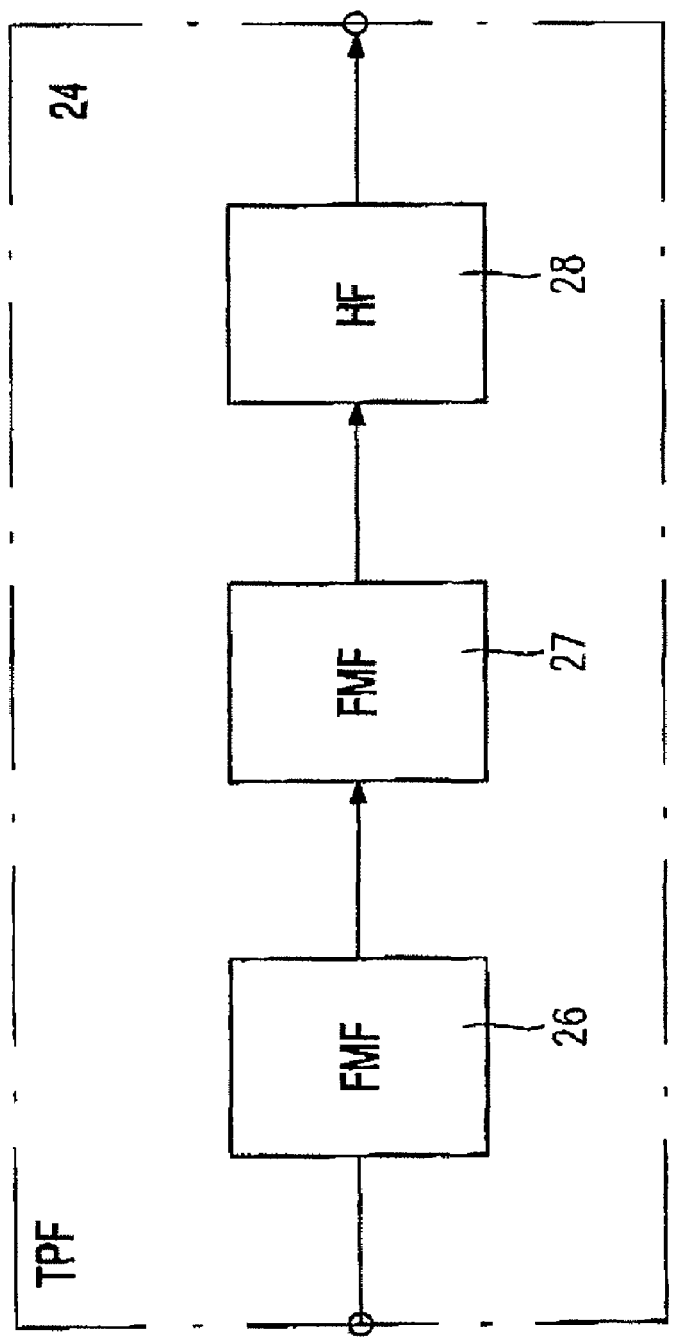
FIG. 8 shows a block diagram of a clock filter as is contained in the embodiment illustrated in FIG. 7.

The construction of the clock phase filter 24 contained in the receiver 1 is illustrated in FIG. 8. The clock phase filter 24 comprises two series-connected frequency matched filters 26, 27 and a Hilbert filter 28. The transfer function FMF (f) of the two series-connected frequency matched filters 26, 27 in each case corresponds to the first derivative $$\frac{dM(f)}{df}$$

of the transfer function MF (f) of the matched filter 8. The Hilbert filter 28 achieves a further phase shift by 90 degrees. This stabilizes the control. The order of the three series-connected filters 26, 27, 28 is arbitrary.

In the embodiment illustrated in FIG. 7, the delay circuit 25 comprises a plurality of delay elements, the group delay time of the clock phase filter 24 and of the delay circuit 25 preferably being identical. What is thereby achieved is that the associated samples are multiplied together by the multiplier 11. The delay circuit 25 and the clock phase filter 24 furthermore have the same decimation ratio. The data symbol rate of the matched filter 8 is a constant factor r higher than the data symbol rate of the digital reception signal output by the analog/digital converter 4. The clock phase filter 24 and the delay circuit 25 have a decimation ratio r, so that the output signal respectively output by them has the data symbol rate of the digital input signal.

Figure 9:
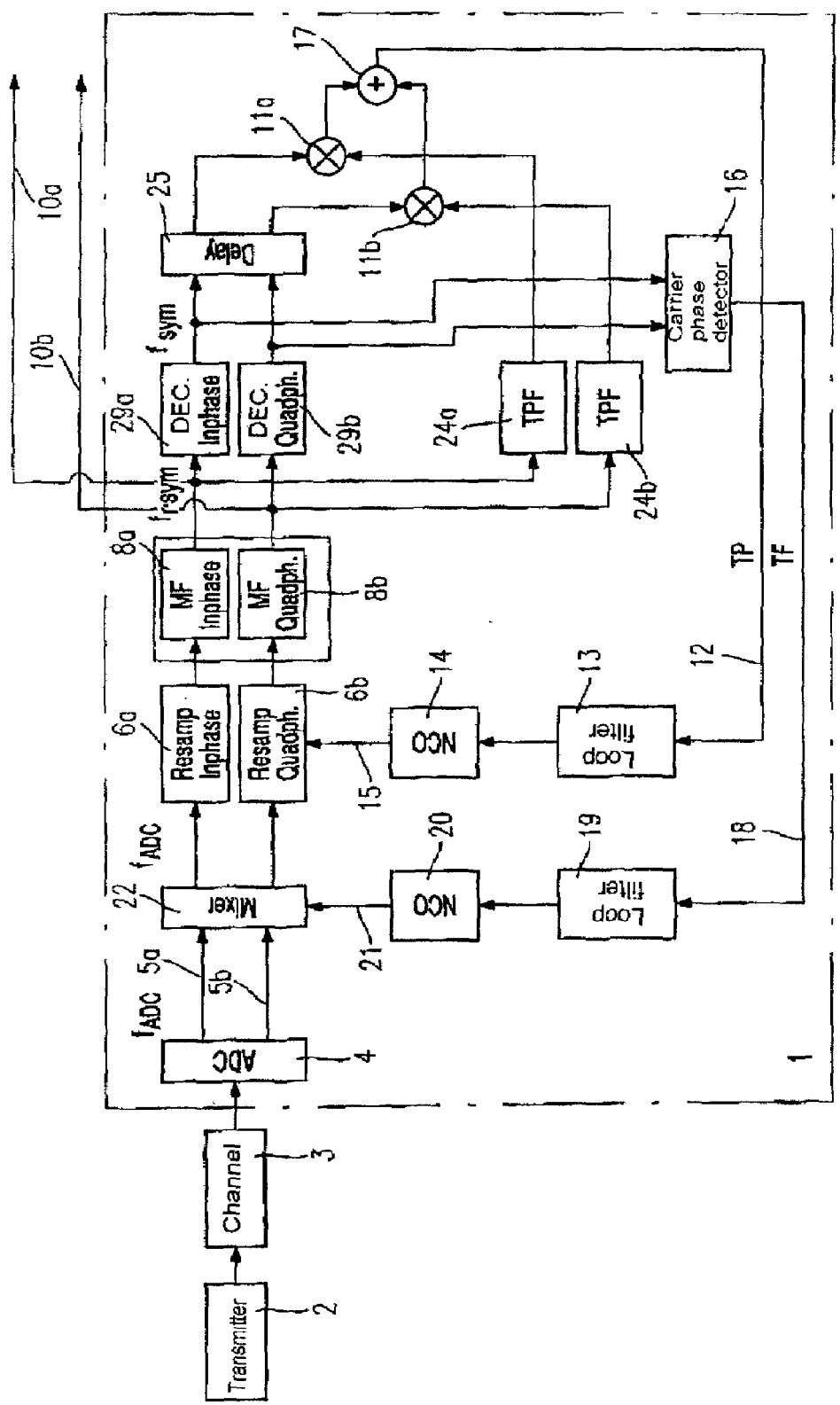
FIG. 9 shows a fifth embodiment of the invention's receiver with integrated clock phase detector.

FIG. 9 shows a fifth embodiment of the receiver 1 according to the invention. Like the second embodiment illustrated in FIG. 5, the embodiment illustrated in FIG. 9 is a QAM receiver. In this case, the receiver 1 contains a matched filter 8a for the in-phase signal component and a matched filter 8b for the quadrature phase signal component. The output signals of the two matched filters 8a, 8b are respectively forwarded to an associated clock phase filter 24a, 24b, which have the circuitry construction illustrated in FIG. 8. Furthermore, the output signals of the two matched filters 8a, 8b are fed to decimation filters 29a, 29b connected downstream, which in each case decimate the digital output signal of the matched filter and output it to a delay circuit 27 connected downstream. The group delay time of the series circuit comprising decimation filter 29 and the delay circuit 25 corresponds to the group delay time of the associated clock phase filter 24. The in-phase signal component is output from the delay circuit 25 to a multiplier 11a, which multiplies the delayed in-phase signal component by the in-phase signal component filtered by the clock phase filter 24a and outputs it to the adder 17. In the same way, the quadrature signal component is output from the delay circuit 25 to a multiplier 11b, which multiplies the delayed quadrature signal component by the quadrature phase signal component filtered by the clock phase filter 24b and outputs it to the other input of the adder 17. The adder 17 carries out averaging and outputs a clock phase deviation detection signal TP to the loop filter 13.

Figure 10:
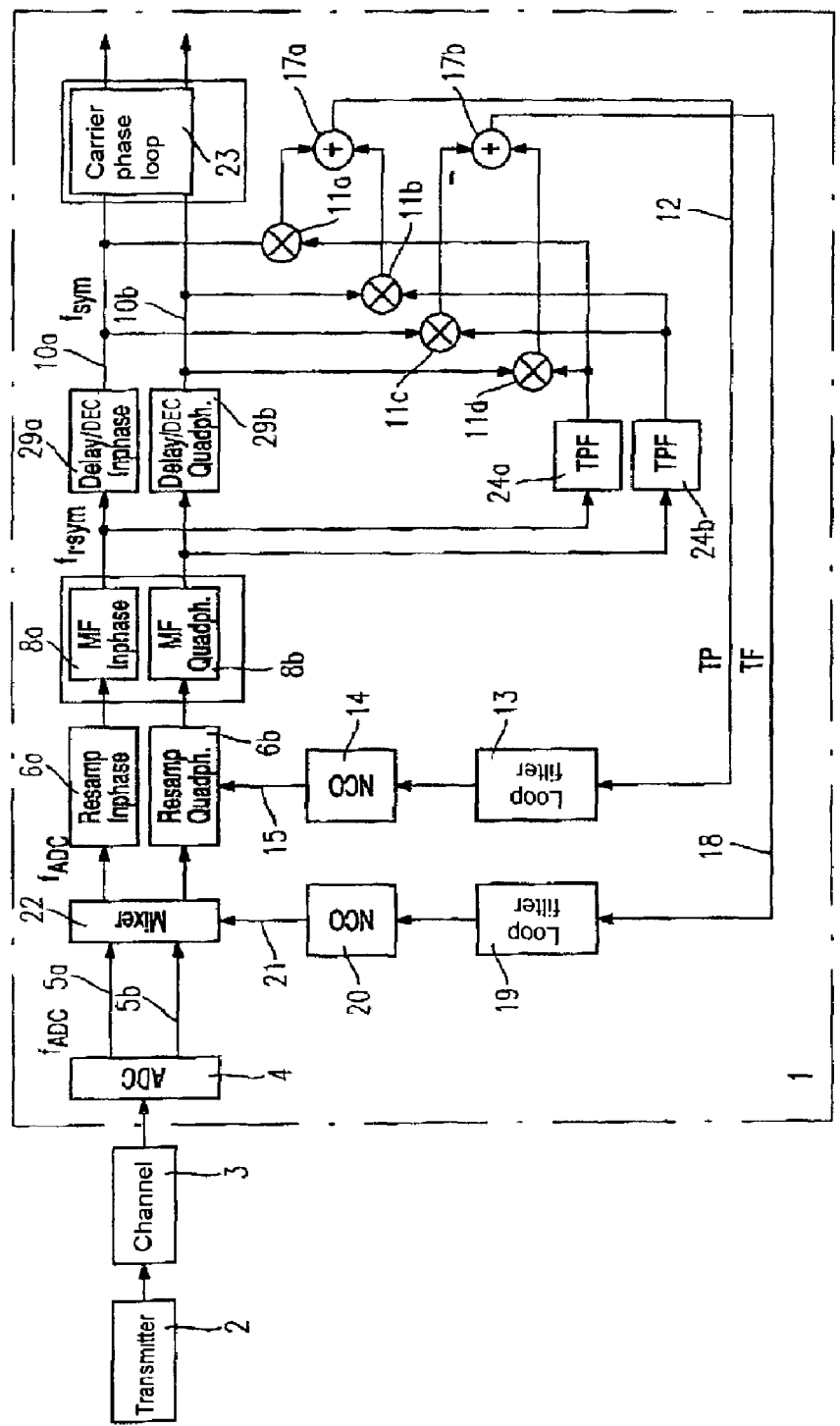
FIG. 10 shows a sixth embodiment of the invention's receiver with integrated clock phase detector and carrier frequency loop.

FIG. 10 shows a sixth embodiment of the receiver 1 according to the invention. The sixth embodiment illustrated in FIG. 10 is a QAM receiver, the carrier frequency deviation detection signal TF being formed by two multipliers 11c, 11d and a further adder 17b. The carrier frequency detection signal TF is formed by averaging of the two output signals of the multipliers 11c, 11d. In this case, the multiplier 11c multiplies the delayed in-phase signal component by the quadrature signal component filtered by the clock phase filter 24b. In the same way, the multiplier 11b multiplies the delayed quadrature signal component by the in-phase signal component filtered by the clock phase filter 24a.

Figure 11:
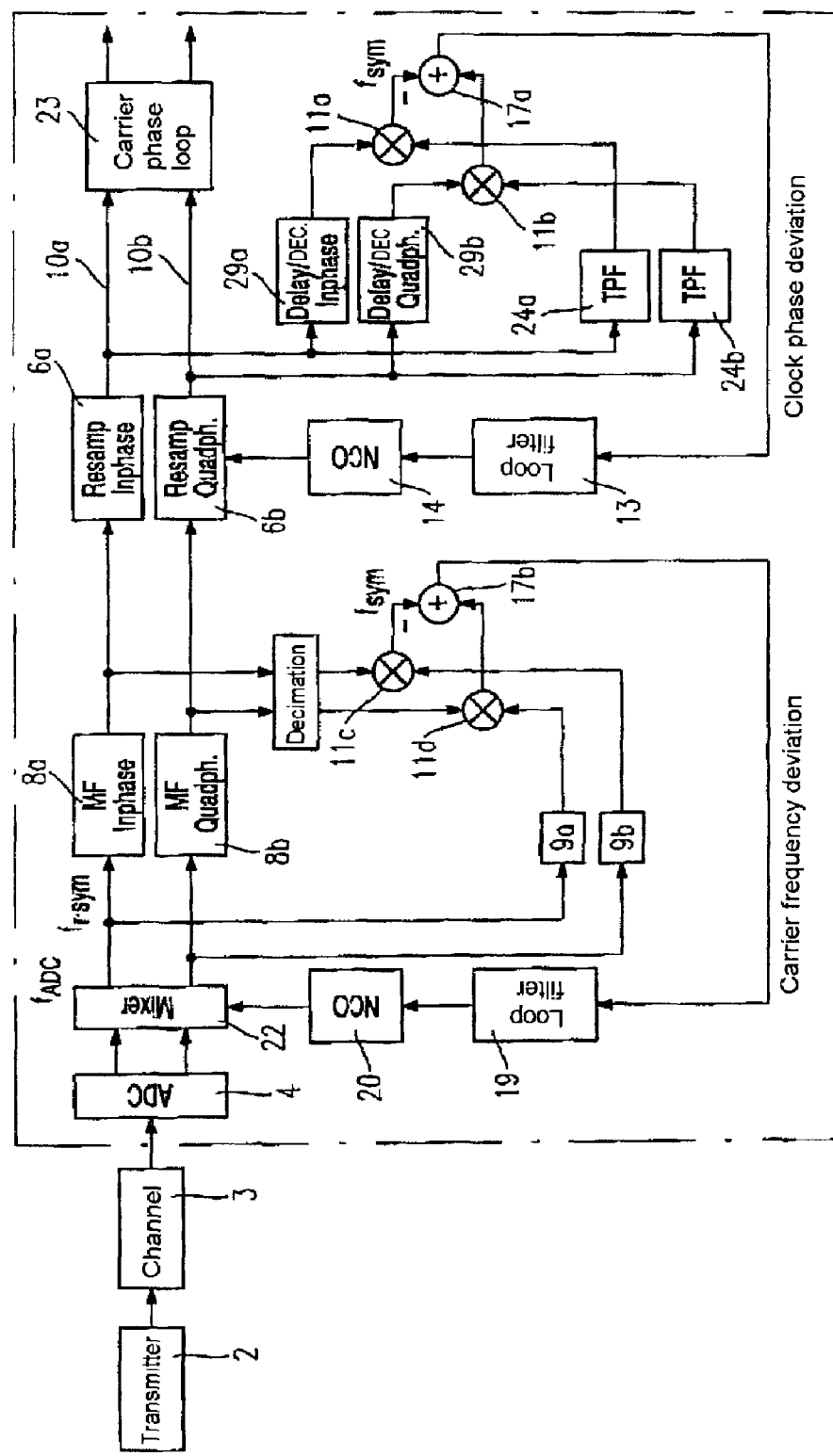
FIG. 11 shows a seventh embodiment of the receiver according to the invention
Figure 12:
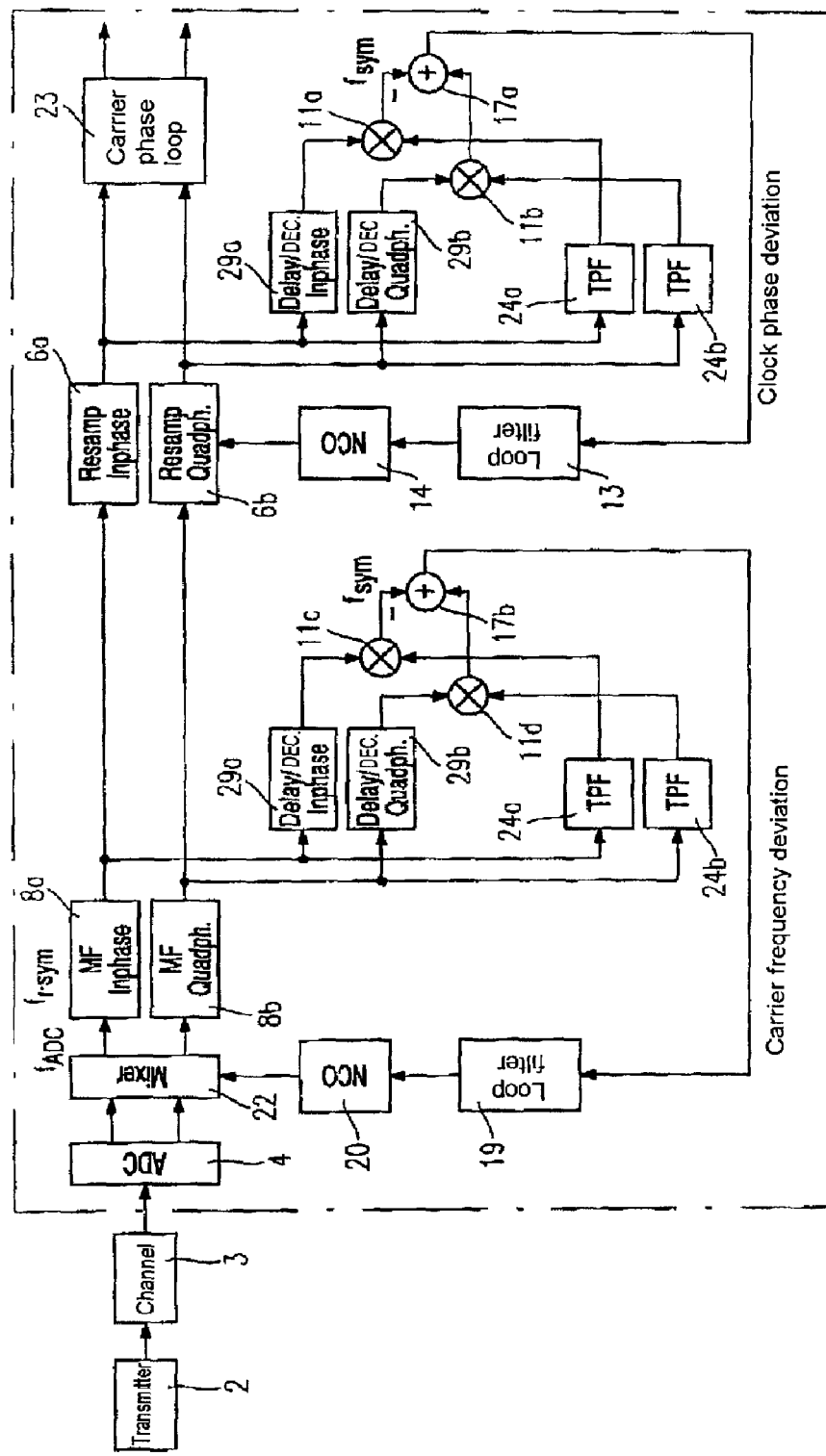
FIG. 12 shows an eighth embodiment of the receiver according to the invention

FIG. 11 and FIG. 12 show a seventh embodiment and an eighth embodiment of the receiver according to the invention with decoupled feedback loops for carrier frequency and clock speed control.

Figure 13:
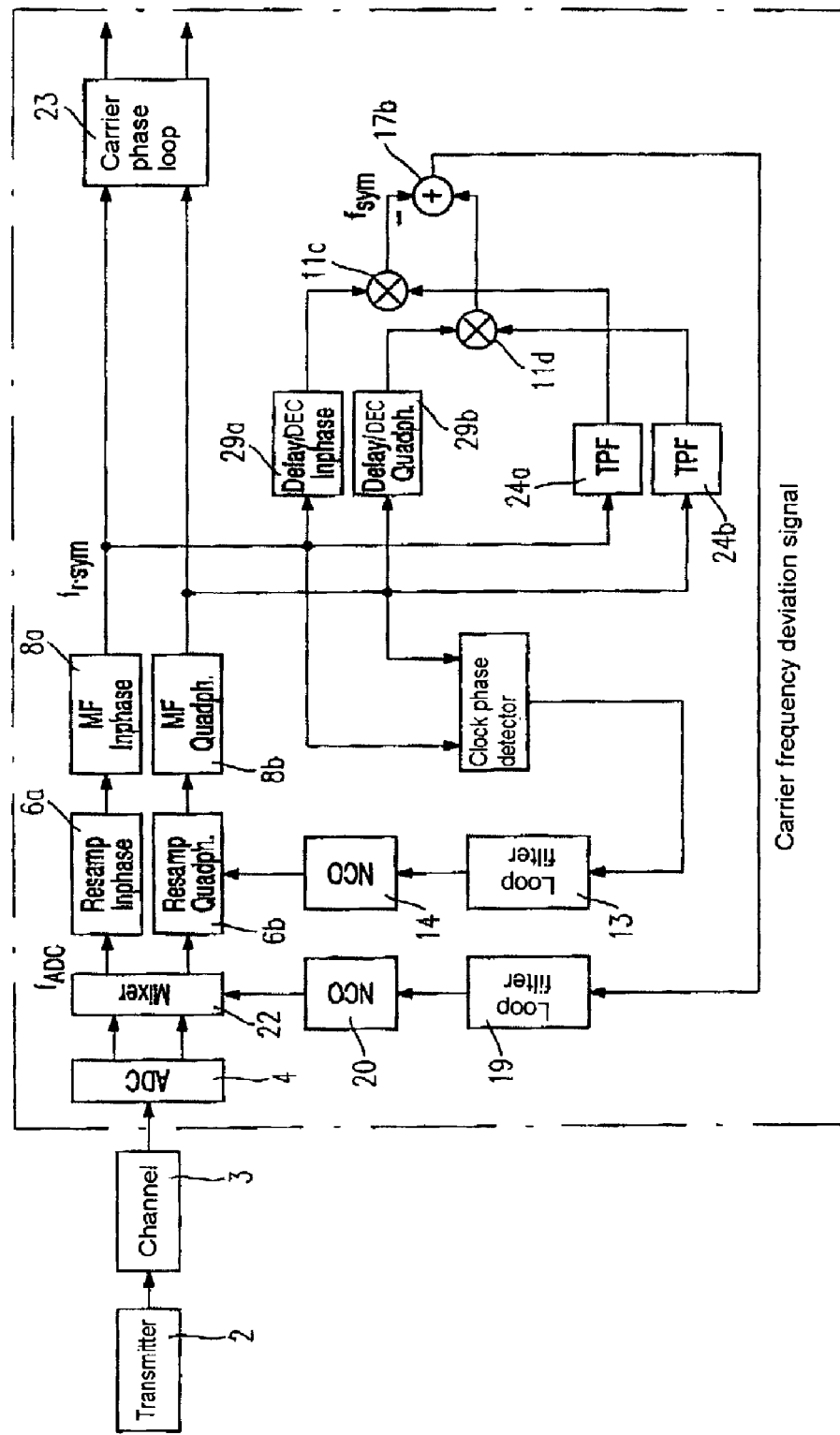
FIG. 13 shows a ninth embodiment of the receiver according to the invention.

FIG. 13 shows a ninth embodiment of the receiver having a carrier frequency detector constructed according to the invention, the tapping downstream of the matched filter 8a, 8b facilitating equalization of the transmission channel.

In the nine embodiments of the receiver 1 according to the invention as illustrated in FIGS. 4 to 13, the digital clock and carrier frequency recovery is effected without having recourse to decisions in the process. The receiver 1 according to the invention is thus an NDA receiver (NDA: non decision aided). In the adjusted state, i.e. when the clock phase and the carrier frequency are adjusted exactly to the input signal, the clock phase deviation detection signal TP and the carrier frequency deviation detection signal TF are a sequence of zeros in the receiver 1 according to the invention. Both the clock phase detection signal TP and the carrier frequency detection signal TF are thus completely noise-free in the adjusted state of the receiver 1, i.e. they have no inherent noise. This means that the circuitry outlay for the two loop filters 13, 19 can be kept minimal, so that the reaction times for the setting of the resampling filters 6a, 6b via the loop filter 13 and the setting of the mixer 22 via the loop filter 19 can be effected rapidly. In this way, the receiver 1 according to the invention can react rapidly to variations in the clock phase or carrier frequency of the received signal and is thus less sluggish than a conventional receiver as is illustrated for example in FIG. 1.

LIST OF REFERENCE SYMBOLS

1 Receiver
2 Transmitter
3 Transmission channel
4 Analog/digital converter
5 Line
6 Resampling filter
7 Line
8 Matched filter
9 Frequency matched filter
10 Line
11 Multiplier
12 Line
13 Loop filter
14 NCO
15 Control line
16 Carrier phase detector
17 Adder
18 Line
19 Loop filter
20 NCO
21 Control line
22 Mixer
23 Carrier phase loop
24 Clock phase filter
25 Delay circuit
26, 27 Frequency matched filter
28 Hilbert filter
29 Decimation filter

What is claimed is:

1. Receiver having an integrated clock phase detector for the detection of a clock phase deviation between desired sampling instants and sampling instants of a reception signal which is transmitted from a transmitter with a transmission filter via a transmission channel to the receiver, having at least one matched filter and having at least one frequency matched filter, the magnitude of a first convolution product of an impulse response of the transmission filter, of the transmission channel and of the matched filter, for the maximization of the signal/noise power ratio of the reception signal, being maximal at the desired sampling instants, the transfer function of the frequency matched filter being the first derivative in the frequency domain of the transfer function of the matched filter, wherein at least one multiplier is provided, which multiplies an output signal of the matched filter by an output signal of the frequency matched filter to form a clock phase deviation detection signal.

2. Receiver according to claim 1, wherein the magnitude of a second convolution product of the impulse response of the transmission filter, of the transmission channel and of the frequency matched filter is minimal at the desired sampling instants.

3. Receiver according to claim 1, wherein the output data symbol rate of the matched filter and the data symbol rate of the digital reception signal are identical.

4. Receiver according to claim 1, wherein the receiver is a PAM receiver.

5. Receiver according to claim 1, wherein the clock phase deviation detection signal is output from the multiplier to a digital loop filter.

6. Receiver according to claim 5, wherein an NCO is connected downstream of the digital loop filter.

7. Receiver according to claim 6, wherein the NCO drives a digital resampling filter.

8. Receiver according to claim 1, wherein the matched filter is a root cosine roll-off filter.

9. Receiver according to claim 1, wherein an analog/digital converter is provided, which converts an analog reception signal received via the transmission channel into a digital reception signal, the digital reception signal having a specific data symbol rate.

10. Receiver according to claim 7, wherein the digital resampling filter filters a digital reception signal, the digital signal output by the resampling filter having a data symbol rate which is a factor r higher than the data symbol rate of the digital reception signal.

11. Receiver according to claim 1, wherein a channel equalization circuit is provided.

12. Receiver according to claim 1, wherein the receiver contains a carrier phase detector.

13. QAM receiver having an integrated clock phase detector for the detection of a clock phase deviation between desired sampling instants and sampling instants of a reception signal which is transmitted from a transmitter with a transmission filter via a transmission channel to the receiver, and having a first matched filter for an in-phase signal component and a second matched filter for a quadrature signal phase component, the magnitude of a first convolution product of an impulse response of the transmission filter, of the transmission channel and of the matched filter, for the maximization of the signal/noise power ratio of the reception signal, being maximal at the desired sampling instants, wherein there are connected downstream of the matched filters in each case a clock phase filter and, connected in parallel therewith, a delay circuit, the in-phase signal component filtered by the first matched filter and by the first clock phase filter being multiplied by the quadrature phase signal component delayed by the second delay circuit to form a first carrier phase product signal, the quadrature signal component filtered by the second matched filter and by the second clock phase filter being multiplied by the in-phase signal component delayed by the first delay circuit to form a second carrier phase product signal, and in that a subtractor is provided, which subtracts the second carrier phase product signal from the first carrier phase product signal in order to generate a carrier phase deviation detection signal.

14. Receiver having an integrated clock phase detector for the detection of a clock phase deviation between desired sampling instants and sampling instants of a reception signal which is transmitted from a transmitter with a transmission filter via a transmission channel to the receiver, having at least one matched filter and having at least one frequency matched filter, the magnitude of a first convolution product of the impulse response of the transmission filter, of the transmission channel and of the matched filter, for the maximization of the signal/noise power ratio of the reception signal, being maximal at the desired sampling instants, the transfer function of the frequency matched filter being the first derivative in the frequency domain of the transfer function of the matched filter, wherein at least one multiplier is provided, which multiplies an output signal of the matched filter by an output signal of the frequency matched filter to form a clock phase deviation detection signal, wherein the receiver is a QAM receiver, the QAM receiver having:

(a) a first matched filter for an in-phase signal component,
(b) an associated first frequency matched filter,
(c) a second matched filter for a quadrature phase signal component,
(d) an associated second frequency matched filter,
(e) a first multiplier, which multiplies the output signal of the first matched filter by the output signal of the first frequency matched filter to form a first clock phase product signal,
(f) a second multiplier, which multiplies the output signal of the second matched filter by the output signal of the second frequency matched filter to form a second clock phase product signal, and
(g) an adder, which adds the two clock phase product signals to form the clock phase deviation detection signal.

* * * * *